(12) United States Patent
Ros-Giralt et al.

(10) Patent No.: US 11,233,803 B2
(45) Date of Patent: Jan. 25, 2022

(54) SYSTEMS AND METHODS FOR MULTIRESOLUTION PARSING

(71) Applicant: Reservoir Labs, Inc., New York, NY (US)

(72) Inventors: Jordi Ros-Giralt, Newport Beach, CA (US); Alan Commike, San Jose, CA (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 443 days.

(21) Appl. No.: 16/397,257

(22) Filed: Apr. 29, 2019

(65) Prior Publication Data

US 2019/0289023 A1    Sep. 19, 2019

Related U.S. Application Data

(63) Continuation of application No. 14/883,294, filed on Oct. 14, 2015, now Pat. No. 10,313,361.

(60) Provisional application No. 62/063,447, filed on Oct. 14, 2014.

(51) Int. Cl.
*G06F 16/00* (2019.01)
*H04L 29/06* (2006.01)
*G06F 16/903* (2019.01)

(52) U.S. Cl.
CPC .... *H04L 63/1408* (2013.01); *G06F 16/90344* (2019.01)

(58) Field of Classification Search
CPC ................ G06F 16/90344; H04L 63/1408
See application file for complete search history.

(56) References Cited

U.S. PATENT DOCUMENTS

2009/0259679 A1*  10/2009  Thiesson ............ G06F 16/904

OTHER PUBLICATIONS

Mstislav Maslennikov and Tat-Seng Chua, "A Multi-Resolution Framework for Information Extraction From Free Text", Proceedings of the 45th Annual Meeting of the Association of Computational Linguistics, pp. 592-599 (Year: 2007).*
Janko Calic and Ebroul Izquierdo, "A Multiresolution Technique For Video Indexing and Retrieval", IEEE, p. 952-955. (Year: 2002).*

* cited by examiner

*Primary Examiner* — Cheryl Lewis
(74) *Attorney, Agent, or Firm* — Goodwin Procter LLP

(57) ABSTRACT

A multiresolution parser (MRP) can selectively extract one or more information units from a dataset based on the available processing capacity and/or the arrival rate of the dataset. Should any of these parameters change, the MRP can adaptively change the information units to be extracted such that the benefit or value of the extracted information is maximized while minimizing the cost of extraction. This tradeoff is facilitated, at least in part, by an analysis of the spectral energy of the datasets expected to be processed by the MRP. The MRP can also determine its state after a processing iteration and use that state information in subsequent iterations to minimize the required computations in such subsequent iterations, so as to improve processing efficiency.

22 Claims, 11 Drawing Sheets

```
Parser::carve(dataSet, offset, featureSet, index) {
   if(index.featureId)
      return index;
   for(featureId in featureSet) {
      value, length = findFeature(dataSet, offset, index.length, featureId);
      if(value) {
         if(length < index.length) {
            newIndex = new Parser::index;
            index.length = index.length - length;
            indexStore(dataSet, offset + length, index);
         }
         else {
            newIndex = index;
         }
         newIndex.length = length;
         newIndex.featureId = featureId;
         newIndex.value = value;
         indexStore(dataSet, offset, newIndex);
         return newIndex;
      }
      else {
         index.nonFeatureSet = index.nonFeatureSet U featureId;
      }
   }
   return index;
}
```

FIG. 4

```
Parser::parse(dataSet, offset, featureSet) {
currentOffset = offset;
while(currentOffset <= dataSet.length) {
    index = lookupIndex(dataSet, currentOffset);
    if(!index) {
        index = new Parser::index;
        index.length = dataSet.length - currentOffset;
        index.nonFeatureSet = NULL;
        index.featureId = NULL;
        indexStore(dataSet, offset, index);
    }
    if(!index.featureId AND featureSet\index.nonFeatureSet != NULL)
        index = carve(dataSet, currentOffset, featureSet\index.nonFeatureSet, index);
    currentOffset += index.length;
    }
    return;
}
```

FIG. 5

```
Parser::findFeature(dataSet, offset, length, featureId) {
        Search for featureId within the range of data dataSet[offset : offset+length].
        If found, return the value of the feature and its actual length.
        Otherwise, return NULL.
}
Parser::indexStore(dataSet, offset, index) {
        Store the key-value pair [offset, index] using offset as key into a table associated
with dataSet.
}
```

FIG. 6

| Resolution Level 2 | |
|---|---|
| Resolution Layer 1 | Resolution Layer 2 |
| Information Unit 1 | Information Unit 2 |
| Event 1 | Event 2 | Event 3 |
| Set of Feature Subsets 1 | Set of Feature Subsets 2 |
| Feature Subset 1 | Feature Subset 2 | Feature Subset 3 |
| Feature 1 | Feature 2 | Feature 3 | Feature 4 | Feature 5 | Feature 6 |

FIG. 9A

| Resolution Level 3 |||||
|---|---|---|---|---|
| Resolution Layer 1 || Resolution Layer 2 | Resolution Layer 3 ||
| Information Unit 1 || Information Unit 2 | Information Unit 3 ||
| Event 1 | Event 2 | Event 3 | Event 4 | Event 5 |
| Set of Feature Subsets 1 || Set of Feature Subsets 2 | Set of Feature Subsets 3 ||
| Feature Subset 1 | Feature Subset 2 | Feature Subset 3 | Feature Subset 4 | Feature Subset 5 |
| Feature 1, Feature 2, Feature 3 | Feature 4 | Feature 5, Feature 6 | Feature 7, Feature 8 | Feature 9, Feature 10 |

FIG. 9B

SYSTEMS AND METHODS FOR MULTIRESOLUTION PARSING

CROSS-REFERENCE TO RELATED APPLICATIONS

This application is a continuation of U.S. patent application Ser. No. 14/883,294, filed Oct. 14, 2015 U.S. Pat. No. 10,313,361 which claims benefit of priority to U.S. Provisional Patent Application Ser. No. 62/063,447 entitled "Systems and Methods for Multiresolution Parsing," filed on Oct. 14, 2014, the contents of which are incorporated herein by reference in their entirety.

FIELD OF THE INVENTION

This disclosure generally relates to systems and methods for information processing and, in particular, to the design and operation of adaptive parsers.

BACKGROUND

In linear signal processing messages transmitted over a channel are often encoded by a transmitter. At a receiver, only the encoded signal and not the complete original signal is typically received. The information contained in the original signal can be extracted, however, from the encoded signal. In particular, if the original signal can be projected onto a space that confines the signal's energy towards a certain region, then the sender only needs to transmit the non-zero components of the projected signal to allow for its full reconstruction at the receiver side. For instance, a baseband signal with a cut-off frequency $f_c$ has its energy confined in the region $[-f_c, f_c]$ when projected onto the Fourier space and, as a result, a receiver can fully reconstruct the original signal without the need to observe any frequency f in the region $|f|>f_c$. In the time space, this implies that the receiver only needs to observe one sample for every $1/f_n$ seconds of signal, where $f_n=2 \times f_c$ is known as the Nyquist rate.

In some situations, degradation can occur during the extraction of information from an encoded signal. Such an encoding is usually called a lossy compression. Lossy compression, in general, is concerned with the problem of finding n optimal encodings $s_1, s_2, \ldots, s_n$ of a signal s that are transmitted over n different channels with capacities $c_1, c_2, \ldots, c_n$, where encoding $s_i$ is transmitted over channel i and the capacities of the channels are in increasing order, $c_i<c_j$ for all i<j. Generally, the optimal encoding is one in which the regions of the projected signal with higher energy are prioritized over those with lower energy. As a channel's capacity decreases, the sender stops transmitting those components that carry less energy. This implies a degradation of the received signal's quality, but in a way that such degradation is minimized.

Many known information processing systems, also known as parsers, that can extract information from structured data (also called a dataset), however, do not extract useful information from only a portion of the dataset. Instead, these parsers typically analyze the complete dataset. Many conventional parsers and/or processing systems lack capacity to process large datasets including, e.g., megabytes, several hundred megabytes, gigabytes, terabytes, or even larger datasets. For example, such parsers may run out of memory and/or the maximum time allowable for processing the dataset. In some situations, while several conventional parsers and processing systems can process the datasets, they may be inefficient and may require large amounts of memory and/or storage, a large number of processors, substantial processing time (e.g., several minutes, hours, or even days), etc.

Similarly, if dataset is received at a high rate, e.g., at several Mbytes/s, Gbytes/s, etc., a conventional parser may not be able to parse the complete dataset at such a high rate. Some conventional parsers, therefore, ignore certain portions of the received dataset. The portions that are not processed by a parser are often selected at random or in a nondiscriminatory manner. The resulting extraction of information can be incomplete and/or inaccurate.

SUMMARY

Various embodiments of a multiresolution parser (MRP) described herein can efficiently solve the nonlinear problem of parsing structured data. Structured data may be understood as data created based on certain rules known by a parser and that it is not white noise or random data. For example, an HTTP header found in an IP packet is a form of structured data since its fields follow the rules of a standardized protocol—in this case, the IETF RFC 2616 specification. Because these rules constrain data in certain ways, its energy tends to be confined at certain regions, which provides optimization opportunities for designing high-performance parsers.

In particular, in some embodiments, information units, describing information to be extracted from a dataset, are specified in terms of one or more features of the dataset. A feature, in general, can be the smallest data unit that can carry useful information. Typically for real-time processing, the information units may be categorized into one or more resolution layers. The information layers may be ordered, e.g., using the expected spectral energy of the dataset, such that a cost-benefit metric corresponding to the information unit(s) associated with a resolution layer is not worse than the cost-benefit metric corresponding to the information unit(s) associated with the subsequent resolution layer(s).

A resolution level may be selected according to the available processing capacity and/or the input data rate and, should any of these parameters change during parsing of a dataset, the resolution level can be changed. In general, the resolution level can be increased by adding one or more resolution layers in order and the resolution level can be deceased by removing one or more resolution layers in reverse order. Parsing performed this way can ensure that a substantial effort is spent in analyzing complete features and that processing of information unit(s) that have a greater benefit or value and/or lower cost than other information unit(s) is prioritized.

In some embodiments, an MRP stores its state after each of one or more iterations. If a new information unit is to be processed in the next iteration, the MRP can use the stored state information to carve out features that need not be processed again and portions of the dataset that also need not be processed again. This can minimize the number of required computation in the next iteration and can thus increase the efficiency of the MRP.

Accordingly, in one aspect, a method for parsing a dataset that includes a set of bitsets, includes, performing by a processor, the step of selecting a first resolution level. The selection is based at least in part on a first value of a performance constraint, such as available processing capacity, memory, and/or time for processing. The first resolution level corresponding to a first subset of resolution layers from a set of resolution layers. Each resolution layer in the set of resolution layers is associated with: (i) a respective information unit, and (ii) a respective, set of feature subsets. An information unit can be a single event, a set of events, a policy, a set of policies, and/or one or more units of other hierarchies.

The method also includes, performing by the processor, the steps of determining if a subset of bitsets in the dataset corresponds to a first feature group including or consisting essentially of the respective sets of feature subsets associated with the set of resolution layers corresponding to the first resolution level. Thus, it is determined if at least a portion of the dataset includes one or more features corresponding to a first information unit. If all features corresponding to the first information unit exist in the processed portion of the dataset, the method includes determining by the processor that the first information unit, that corresponds to the first resolution level, is associated with (e.g., exists in) the dataset. Otherwise, the method includes determining by the processor that the first information unit corresponding to the first resolution level is not associated with the dataset.

In some embodiments, the method further includes selecting by the processor, based at least in part on a second value of the performance constraint, a second resolution level. The second resolution level may correspond to a second subset of resolution layers from the set of resolution layers. In addition, the method may include determining by the processor if a subset of bitsets in the dataset corresponds to a second feature group including or consisting essentially of the respective sets of feature subsets associated with the set of resolution layers corresponding to the second resolution level. Thus, it is determined if at least a portion of the dataset includes one or more features corresponding to a second information unit. If all the features associate with the second information unit are determined to exist in the dataset (or in an analyzed portion thereof), the method may include determining by the processor that the second information unit corresponding to the second resolution level is associated with the dataset. Otherwise, the method may include determining by the processor that the second information unit corresponding to the second resolution level is not associated with the dataset.

In some embodiments, the second feature group includes the first feature group. Thus, all of the features in the first feature group are included in the second feature group. The second feature group may include one or more additional features. The second information unit may include the first information unit. Thus, any event(s) (or other unit(s) of hierarchy) included in the first information unit are also included in the second information unit. Thus, the second resolution level is higher than the first resolution level.

In some embodiments, the second feature group lacks at least one feature subset from the first feature group, and the second information unit is smaller than the first information unit. For example, the number of units of hierarchy (e.g., events, policies, etc.) corresponding to the second information unit is less than the number of units of hierarchy corresponding to the first information unit. Thus, in these embodiments, the second resolution level is lower than the first resolution level. The first subset of resolution layers may be the same as the set of resolution layers. Thus, the first resolution level may correspond to the full resolution, where all feature sets are processed.

In some embodiments, each bitset from at least a subset of bitsets is associated with a respective, particular feature, according to a specified map. Determining if the subset of bitsets in the dataset corresponds to the first feature group may include excluding one or more bitsets that are not mapped to any feature in the sets of feature subsets associated with the resolution layers corresponding to the first resolution level. Thus, if the association between bitsets of the dataset and features is known a priori, i.e., the locations in the dataset where one or more features may be located if present are known a priori, the bitsets corresponding to the features that are not to be tested can be skipped. The subset of bitsets in some embodiments is same as the set of bitsets in the dataset. Thus, all bitsets in the dataset are processed according to a selected resolution level.

In another aspect, a system is provided for parsing a dataset that includes a set of bitsets. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to select, based at least in part on a first value of a performance constraint, a first resolution level. The first resolution level may correspond to a first subset of resolution layers from a set of resolution layers. Each resolution layer in the set may be associated with: (i) a respective information unit, and (ii) a respective set of feature subsets.

The instructions further program the processing unit to determine if a subset of bitsets in the dataset corresponds to a first feature group including or consisting essentially of the respective sets of feature subsets associated with the set of resolution layers corresponding to the first resolution level. The instructions also program the processing unit to determine, should the processing unit make the above-described determination, that a first information unit corresponding to the first resolution level is associated with the dataset and, otherwise, to determine that the first information unit corresponding to the first resolution level is not associated with the dataset. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to parse a dataset that includes a set of bitsets. The instructions may program the processing unit to select, based at least in part on a first value of a performance constraint, a first resolution level. The first resolution level may correspond to a first subset of resolution layers from a set of resolution layers. Each resolution layer in the set may be associated with: (i) a respective information unit, and (ii) a respective set of feature subsets.

The instructions further program the processing unit to determine if a subset of bitsets in the dataset corresponds to a first feature group including or consisting essentially of the respective sets of feature subsets associated with the set of resolution layers corresponding to the first resolution level. The instructions also program the processing unit to determine, should the processing unit make the above-described determination, that a first information unit corresponding to the first resolution level is associated with the dataset and, otherwise, to determine that the first information unit corresponding to the first resolution level is not associated with the dataset. In various embodiments, the instructions can program the processing unit to perform one or more of the method steps described above.

In another aspect, a method is provided for parsing a dataset that includes a set of bitsets. The method includes performing by a processor the step of selecting, based at least in part on a first information unit to be processed, a first subset of resolution layers that corresponds to the first information unit. The first subset of resolution layers is selected from a set of resolution layers, where each resolution layer in the set is associated with: (i) a respective, distinct information unit, and (ii) a respective set of feature subsets associated with that information unit. An information unit can be one or more units of hierarchy such as a single event, a set of events, a policy, a set of policies, etc.

The method also includes assembling by the processor a first feature group including or consisting essentially of the sets of feature subsets associated with the first subset of resolution layers. Thus, all the features corresponding to the first information unit may be included in the first feature group. In some embodiments, the first feature group may include only those features that correspond to the first information unit. The method further includes identifying by the processor from the set of bitsets of the dataset a first subset of bitsets corresponding to a first subgroup of features selected from the first feature group. Thus, it may be determined whether one or more features in the first feature group exist in the dataset or a portion thereof. If one or more such features do exist in the dataset, the first subset of bitsets may represent the locations of those features in the dataset and the corresponding bitsets. In some embodiments, the first subgroup of features is same as the first feature group. This can imply that all features in the first group of features were found in the dataset.

In some embodiments, the method includes selecting by the processor, based at least in part on a second information unit, a second subset of resolution layers corresponding to the second information unit. The second subset of resolution layers is also selected from the set of resolution layers. In addition, the method may include assembling by the processor a second feature group including or consisting essentially of the sets of feature subsets associated with the second subset of resolution layers. Thus, all of the features corresponding to the second information unit may be included in the second feature group. The method may also include generating by the processor a modified second feature group, by excluding from the second feature group the first subgroup of features. Thus, features that correspond to both the first information unit and the second information unit, and that were found previously while processing the first information unit may be carved out from the second feature group, to obtain the modified second feature group.

The method may further include generating by the processor a second subset of bitsets of the dataset by excluding from the set of bitsets the first subset of bitsets. Thus, the sets of bitsets that were processed previously during analysis of the first information unit may be carved out from the overall dataset or a portion thereof. These carved out bitsets may correspond to features that are associated with the first information unit but not with the second information unit and, as such, these carved out bitsets are typically not relevant to the processing of the second information unit.

The method may also include identifying by the processor from the second subset of bitsets a third subset of bitsets corresponding to a second subgroup of features selected from the modified second feature group. The second subgroup of features thus may include all the features from the modified second feature group that are present in the carved dataset. The third subset of bitsets may correspond to all such features that were found in the carved dataset, and may describe the respective locations of these features in the overall dataset. The general process described above, that includes carving out duplicate features and/or carving out previously processed bitsets from the dataset can be repeated for one or more additional information units.

In some embodiments, the method further includes identifying by the processor an absent feature from the first feature group. The absent feature is a feature associated with the first information unit that does not correspond to any bitset from the set of bitsets of the dataset. Thus, the absent feature was not found in the dataset during processing of the first information unit. The method may also include selecting by the processor, based at least in part on a second information unit, a second subset of resolution layers corresponding to the second information unit. The second subset of resolution layers may be selected from the set of resolution layers. The method may also include assembling by the processor a second feature group including consisting essentially of the sets of feature subsets associated with the second subset of resolution layers. Thus, all of the features corresponding to the second information unit may be included in the second feature group.

The method may further include determining by the processor that the second feature group includes the absent feature. Thus, the absent feature is associated with both the first information unit and the second information unit. The method may also include determining by the processor, without further processing of any portion of the dataset, that the second information unit does not exist in the dataset. This may follow from the fact that the multiresolution parser according to this embodiment has the knowledge that the absent feature, that is required by the second information unit, was not found during previous processing. A substantial number of computations required for the analysis of the second information unit can thus be avoided, using information from the state of the multi-resolution parser.

In another aspect, a system is provided for parsing a dataset that includes a set of bitsets. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to select, based at least in part on a first information unit, a first subset of resolution layers corresponding to the first information unit. The first subset of resolution layers may be selected from a set of resolution layers. Each resolution layer in the set of resolution layers may be associated with: (i) a respective, distinct information unit, and (ii) a respective set of feature subsets associated with that information unit.

The instructions also program the processing unit to assemble a first feature group including or consisting essentially of the sets of feature subsets associated with the first subset of resolution layers. In addition, the instructions program the processing unit to identify from the set of bitsets of the dataset a first subset of bitsets corresponding to a first subgroup of features selected from the first feature group. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to parse a dataset that includes a set of bitsets. The instructions may program the processing unit to select, based at least in part on a first information unit, a first subset of resolution layers corresponding to the first information unit. The first subset of resolution layers may be selected from a set of resolution layers. Each resolution layer in the set of resolution layers may be associated with: (i) a respective, distinct information unit, and (ii) a respective set of feature subsets associated with that information unit.

The instructions also program the processing unit to assemble a first feature group including or consisting essentially of the sets of feature subsets associated with the first subset of resolution layers. In addition, the instructions program the processing unit to identify from the set of bitsets of the dataset a first subset of bitsets corresponding to a first subgroup of features selected from the first feature group. In various embodiments, the instructions can program the processing unit to perform one or more of the method steps described above.

In another aspect, a method is provided for facilitating resolution-level-based parsing of a dataset that includes a set of bitsets. The method includes performing by a processor the steps of identifying a set of features of a representative dataset, and associating each feature in the set of features with at least one information unit of a number of information units. The method also includes dividing by the processor the set of features into a number of subsets, where each subset is associated with a respective information unit. In addition, the method includes associating by the processor with each resolution layer from several resolution layers: (i) a set of information units, and (ii) the subsets of features associated with the set of information units. Finally, the method includes ranking by the processor the resolution layers according to an importance metric.

Each information unit may include a respective set of hierarchical units such as events. In some embodiments, each information unit includes a respective set of policies, and each policy in a set of policies corresponds to a respective set of events, and each event corresponds to one or more features. The importance metric may include a cost of processing the subsets of features associated with the set of information units, a value of the set of information units, or a combination of the two.

In another aspect, a system is provided for facilitating resolution-level-based parsing of a dataset that includes a set of bitsets. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to identify a set of features of a representative dataset, and to associate each feature in the set of features with at least one information unit of a number of information units.

The instructions also program the processing unit to divide the set of features into a number of subsets, where each subset is associated with a respective information unit. Moreover, the instructions program the processing unit to associate with each resolution layer from several resolution layers: (i) a set of information units, and (ii) the subsets of features associated with the set of information units. Additionally, the instructions program the processing unit to rank the resolution layers according to an importance metric. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to facilitate resolution-level-based parsing of a dataset that includes a set of bitsets. The instructions may program the processing unit to identify a set of features of a representative dataset, and to associate each feature in the set of features with at least one information unit of a number of information units.

The instructions also program the processing unit to divide the set of features into a number of subsets, where each subset is associated with a respective information unit. Moreover, the instructions program the processing unit to associate with each resolution layer from several resolution layers: (i) a set of information units, and (ii) the subsets of features associated with the set of information units. Additionally, the instructions program the processing unit to rank the resolution layers according to an importance metric. In various embodiments, the instructions can program the processing unit to perform one or more of the method steps described above.

In another aspect, a method is provided for facilitating resolution-level-based parsing of datasets. The method includes performing by a processor the steps of identifying a set of information units from a set of analytics, where each information unit in the set of information units is associated with a set of features. The method also includes computing by the processor a spectrum of the set of analytics, where the spectrum includes respective values of an importance metric for each information unit in the set of information units. The importance metric may include one or both of: (i) an information value associated with a corresponding information unit, and (ii) a cost of extracting the set of features associated with the corresponding information unit.

The method further includes ordering by the processor the spectrum according to the respective values of the importance metric. In some embodiments, the spectrum is ordered such that the respective values of the importance metric are decreasing. The method also includes partitioning by the processor the ordered spectrum into a set of resolution layers. Each resolution layer may include a subset of information units, i.e., one or more information units, and the set of features associated with each information unit in the subset of information units.

In some embodiments, each information unit includes a respective set of hierarchical units. Each hierarchical unit may correspond to a first hierarchical level and may include a respective set of hierarchical units corresponding to a second hierarchical level. Each hierarchical unit corresponding to the second hierarchical level may include a respective set of hierarchical units corresponding to a third hierarchical level. The hierarchical units, in general, may include several (e.g., 1, 2, 4, 6, or more) levels of hierarchical units. In some embodiments, each hierarchical unit corresponding to the first hierarchical level comprises an event, and the set of hierarchical units corresponding to the second hierarchical level includes a set of features associated with the information unit.

The cost of extracting the set of features associated with an information unit may be based on one or more of: (i) a length of each feature in the set of features, (ii) cardinality of the set of features, i.e., the number of features in a set, and (iii) a processor characteristic. The processor characteristic may include one or more of: (i) processor speed, and (ii) memory-access cost, thereby at least partially representing the processing cost of extracting a set of features.

In another aspect, a system is provided for facilitating for facilitating resolution-level-based parsing of datasets. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to identify a set of information units from a set of analytics, where each information unit in the set of information units is associated with a set of features. The instructions also program the processing unit to compute a spectrum of the set of analytics, where the spectrum includes respective values of an importance metric for each information unit in the set of information units. The importance metric may include one or both of: (i) an information value associated with a corresponding information unit, and (ii) a cost of extracting the set of features associated with the corresponding information unit.

Moreover, the instructions program the processing unit to order the spectrum according to the respective values of the importance metric, and to partition the ordered spectrum into a set of resolution layers. Each resolution layer may include a subset of information units, i.e., one or more information units, and the set of features associated with each information unit in the subset of information units. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to facilitate resolution-level-based parsing of datasets. The instructions may program the processing unit to identify a set of information units from a set of analytics, where each information unit in the set of information units is associated with a set of features. The instructions also program the processing unit to compute a spectrum of the set of analytics, where the spectrum includes respective values of an importance metric for each information unit in the set of information units. The importance metric may include one or both of: (i) an information value associated with a corresponding information unit, and (ii) a cost of extracting the set of features associated with the corresponding information unit.

Moreover, the instructions program the processing unit to order the spectrum according to the respective values of the importance metric, and to partition the ordered spectrum into a set of resolution layers. Each resolution layer may include a subset of information units, i.e., one or more information units, and the set of features associated with each information unit in the subset of information units. In various embodiments, the instructions can program the processing unit to perform one or more of the method steps described above.

The multiresolution approach described in various embodiments can generally match the characteristics of input data to that of a processing system. A multi-resolution parser that is required to process data beyond the available processing capabilities can make decisions to drop one or more portions of the dataset to be analyzed in a way that higher energy components of the dataset are prioritized over the relatively lower energy components.

BRIEF DESCRIPTION OF THE DRAWINGS

In the following description, various embodiments of the present invention are described with reference to the following drawings, in which:

FIGS. 4-6 show pseudo-codes of carver and parser operators, and supporting processes, according to one embodiment;

FIGS. 9A-9C depict the selection of resolution levels of an adaptive multi-resolution parser, according to another embodiment.

DETAILED DESCRIPTION

Reconstructing Structured Data: Semantic Levels: Data Sets, Features and Events:

Data sets and rulesets: In various embodiments, a data set d is considered to be formed by a sequence of bits $b_1, b_2, \ldots, b_m$ ordered such that $b_i$ precedes $b_j$ if i<j. The dataset d can thus be expressed as a unidimensional array:

$$d=[b_1, b_2, \ldots, b_m]$$

The dataset d is often generated according to a set of rules that are known to the parser and, therefore, d is not white noise or a random signal or a random sequence of bits/bytes. These rules may be referred to as the parser's ruleset or simply as the ruleset. Examples of rulesets are a network protocol defined in a IETF RFC, the programming language C/C++, the English grammar, etc.

Features and feature bitsets: A data set contains basic units of information that are structured according to its ruleset. In various embodiments, these basic units of information are called features. For example, an HTTP packet contains features such as the request type field, the response type field, the user-agent field, etc. Features are confined to a certain subset of bits $\{b_i\}$ within the data set d, which is referred to as the feature bitset.

Figure 1:
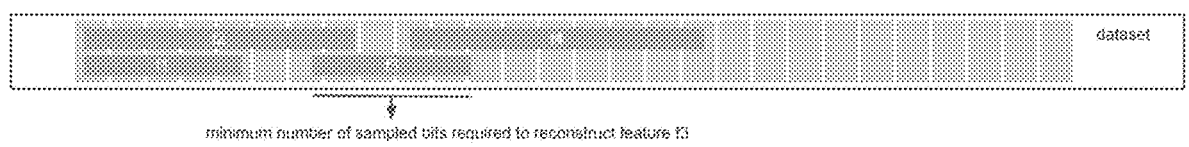
FIG. 1 depicts an example of a dataset and bitsets and features therein, that may be processed using multiresolution parsers according to various embodiments.

With reference to FIG. 1 a dataset can be represented as an array of bits. In one embodiment, bits convey information structured in the form of features f1, f2, f3 and f4. Each feature is confined in a set of bits called the feature bitset. For example, f1 corresponds to the bitset $\{b1, \ldots b5\}$ and f3 corresponds to the bitset $\{b7, \ldots b11\}$.

In general, features by themselves provide a limited scope of information, but can be considered to be the initial building blocks upon which higher semantic levels of information can be constructed. Features also expose a compactness property that is used in designing various embodiments of high-performance multiresolution parsers, as described below.

Property 1: Ex-post feature compactness. A feature bitset can only be determined, e.g., characterized as corresponding to a feature f or as not corresponding to a feature f, after the feature f has been parsed.

The concept of ex-post feature compactness is related to the concept of identifying the minimum number of samples that must be obtained from a baseband signal in order to reconstruct it. As demonstrated by the Nyquist-Shannon sampling theorem, it is generally enough to take one sample every $1/(2 \times f_c)$, where $f_c$ is the highest frequency component—known also as the cut-off frequency—that is found in the baseband signal, and to discard all other data samples. Notice however that the exact value of $f_c$ can often only be derived (ex-post) from the fully reconstructed signal.

Features represent a first level of information, the finest one in granularity. In general, features can be combined to form higher semantic levels in increasing order of granularity. For instance, if a data set corresponds to an HTTP message, some of its features can include the request type, the hostname, the response or error code, or the date, to name a few. By combining the request type and the error code, a parser can conclude whether an HTTP request was successfully replied, yielding a new piece of information. In various embodiments, such feature associations are called events. Events thus represent a second level of information. In some embodiments, and event e is represented as a list of its features: $e=\{f_1, f_2, \ldots, f_n\}$ or, in a more compact form as $e=\{f\}$. Events can be a group of one or more features and/or information derived by analyzing one or more features. Table 1 illustrates some examples of rulesets, data sets, features and events.

TABLE 1

Examples of rulesets, data sets, features and events.

| Ruleset | Data set | Feature | Events |
|---|---|---|---|
| Protocol specification IETF RFC 2616 | A packet carrying an HTTP header | The request field | The pair of request and response fields |
| The programming language C/C++ | A C/C++ program | A variable name | A function |
| The English grammar | A book | A word | A sentence |

Without the loss of generality, some of the embodiments described herein consider up to two semantic levels of information, namely, features and events. In general, however, any number of semantic levels, e.g., 2, 3, 5, 8, 10, or more, can be considered.

Figure 2:
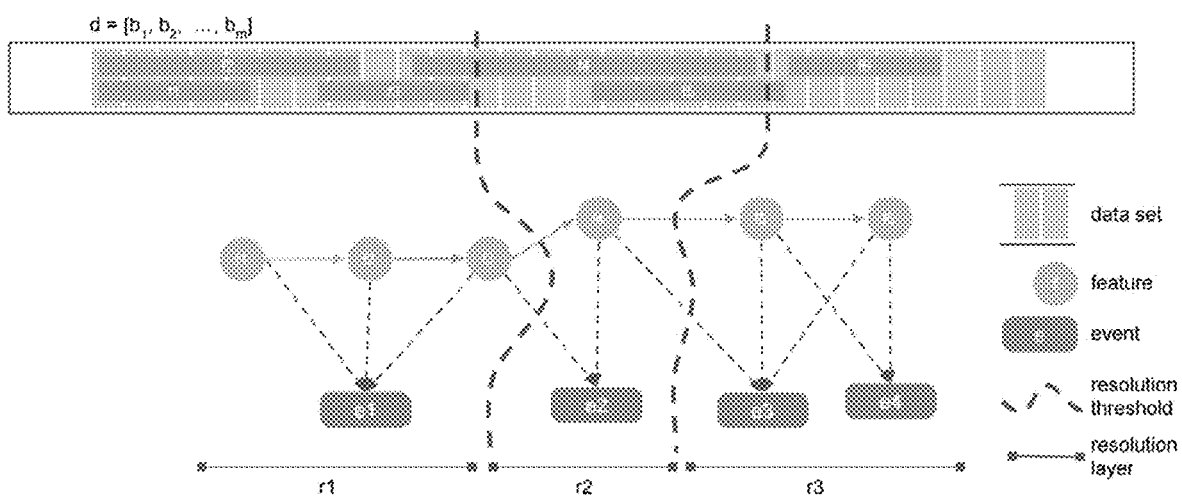
FIG. 2 depicts a spectrum of the dataset shown in FIG. 1 and corresponding resolution layers, according to one embodiment.

Spectrum of a Data Set, Resolution Layers, and Multi-Resolution Parsers:

With reference to FIG. 2, according to one example, a dataset includes six features (f1, f2, f3, f4, f5, and f6) and four events (e1, e2, e3, e4) described according to the following relations:

$$e1=\{f1, f2, f3\}$$

$$e2=\{f3, f4\}$$

$$e3=\{f4, f5, f6\}$$

$$e4=\{f5, f6\}$$

FIG. 2 depicts one particular order in which a parser may detect these events if it were to read the dataset in linear order, i.e. by reading bit $b_i$ before bit $b_j$, for all i<j. In general, however, it is not necessary that the features corresponding to sequentially ordered events form a contiguous order of the bits, bytes, or other units of the dataset. By creating a mapping between the bits of a dataset and the various semantic levels, e.g., features, events, etc., an observer can derive a general idea of which parts of the dataset provide higher information density. This can facilitate an understanding of how energy (information) is distributed within the dataset and which parts may be more relevant when attempting to parse it. Just as the spectral energy distribution of a signal can be used to distinguish between high information carrying portions of the signal from a relatively low information carrying portions thereof, the energy distribution of a dataset can be used to distinguish the portions thereof that carry more information than some other portions of the dataset. Therefore, FIG. 2 can be referred to as a spectrum representation of the dataset d, or simply as its spectrum.

In the problem of transmitting a signal through a communication channel, understanding the spectrum of the signal is important because it allows a transmitter to know how the signal is affected by the channel. If the channel is not capable of transmitting all the components part of the signal's spectrum, the signal will suffer degradation, which is commonly known as the spectral efficiency of the channel. In various embodiments of parsers, in processing structured data, if a parser lacks the processing capacity (e.g., in terms of processing speed, number of processors, memory, available battery life, etc., and/or a combination of two or more of such parameters) to process of all the features it needs to extract, bitsets (also called packets) will need to be dropped, leading to a degradation of the parser's output.

In various embodiments, to minimize this degradation, the parsers are designed according to the spectrum of the datasets they intend to process, and such parsers can make bitset/packet dropping decisions based on such spectra. These packet dropping decisions can be understood as a form of lossy compression on the original dataset. To implement spectrally efficient parsing in various embodiments, a concept of resolution thresholds of the input dataset is introduced. Referring again to FIG. 2, each event is associated with a group of bits in the dataset that contains the features required to process the event. Resolution thresholds break down the spectrum into regions, each region providing enough information to resolve at least one event. These regions are referred to as resolution layers.

Resolution layers provide a mechanism for implementing spectrally efficient parsing of structured datasets, by providing a strategy for dropping packets by the parser in a way that information loss is minimized. For instance, as shown in FIG. 2 the dataset has three resolution layers: $r_1$, $r_2$ and $r_3$. The parsing of each new layer implies an increase in the number of processed events. With this knowledge, in some embodiments, a parser may start processing resolution layer r1, continue with r2 and, if its processing capacity reaches a limit such that some packets cannot be processed, the parser may decide to entirely drop layer r3. This may be done because the events e1 and e2 were determined to be more important (e.g., in terms of processing cost, benefit, or a combination of the cost and the benefit) than events e and e4.

The order in which resolution layers are parsed can be specified by a user, e.g., during offline parsing of datasets. For instance, a parser may start processing layer r3, followed by processing of layer r1, and may decide to drop layer r2, should the parser be directed by a user not to process event e2, at a particular time of processing. In addition, or alternatively, in some embodiments, the resolution layers are selected in an order of importance, or to maximize the spectral efficiency of the parser. In particular, it is worth noticing that the degree of information carried by each resolution layer need not be the same. Therefore, given a set of resolution layers $\{r_1, r_2, \ldots r_n\}$, a preference order can be identified such that if $r_i \geq_p r_j$, the resolution layer $r_i$ is at least as relevant as resolution layer $r_j$. The preference order can describe an increasing resolution sequence.

Increasing resolution sequence (IRS): Let d be a data set and let $r_1, r_2, \ldots, r_n$ define n resolution layers. Let also $\geq_p$ be a preference order relation such that if $r_i \geq_p r_j$, then resolution layer $r_i$ is at least as relevant as resolution layer $r_j$. Then, a sequence of resolution layers $r_1 \rightarrow r_2 \rightarrow \ldots \rightarrow r_n$ is an increasing resolution sequence if $r_i \geq_p r_j$ for all i<j.

The preference order $\geq_p$ in general depends on the trade-off cost versus benefit so that $r_i \geq_p r_j$ necessarily implies that $c(r_i) \leq c(r_j)$ or $b(r_i) \geq b(r_j)$, or both, for some cost and benefit functions c( ) and b( ). An example of cost function is the amount of computing resources required to process a resolution layer, e.g., the number of CPU cycles, memory usage, I/O throughput, etc. The benefit function in general may reflect the information gains from processing a particular resolution layer. Increasing resolution sequences are important in that they provide the blueprints for an optimized parser strategy in various embodiments. Specifically, given a dataset and an IRS $r_1 \rightarrow r_2 \rightarrow \ldots \rightarrow r_n$, an optimized parser may start processing the resolution layer $r_1$ first, continuing with $r_2$, then $r_3$, and so on. A multiresolution parser (MRP), in general, is a parser capable of processing data sets following an increasing resolution sequence.

Performance and Spectral Efficiency of a Parser

As described above, features represent quanta of information in the sense that they cannot be further divided. This means that reconstructing a fraction of a feature generally results in zero additional information; or, equivalently, the parsing of a feature only yields additional information if 100% of such feature is reconstructed. A consequence of this property is that parsers can suffer from performance collapse, a condition in which the parser spends 100% of its resources reconstructing partial features, therefore yielding zero additional information. This condition is characterized by the following property:

Property 2: Feature atomicity: Let feature f be confined in the set of bits $\{b_i\}$ of a data set d. Parsing a percentage p of bits in $\{b_i\}$ results in no additional information if p<100%.

Property 2 reveals one of the links between the design of different parser embodiments and their respective performance. Specifically, Property 2 states that a parser spending most of its time processing features partially is, all other things being equal, less efficient than a parser spending most of its time processing features completely. The later parser is considered to be spectrally more efficient than the former one.

Spectral efficiency of a parser on a dataset: The spectral efficiency of various embodiments of parsers can be a measure of information processed by a parser per processing unit and can be measured in information units/cycle. For example, if a parser running on a 1 GHz processor can extract events from a dataset at a rate of 2,000 events per second, its spectral efficiency is $2 \times 10^{-6}$ events/cycle. An information unit can be a feature, an event, or other quantities of information described in terms of one or more features.

Parsing and Carving

Assume that a parser is to be designed to extract a certain event e' from a dataset d such that event e' requires the identification of the feature set $\{f'\}$. Further assume that: (i) d has not been parsed before; and (ii) that there is no need to parse d a second time. The first statement indicates that the initial conditions of the parser are NULL, whereas the second statement implies that keeping track of the final conditions of the parser is not necessary. In this case, because neither the initial nor the final conditions are relevant, the dataset d may be run through the parser to extract the feature set $\{f'\}$ without concerns about the past or the future. This memoryless operation may be referred to as parsing.

Now suppose that a second event e needs to be extracted from the dataset d, where the event e requires the identification of the feature set $\{f\}$. Recall, parsing is a memoryless operation and a conventional parser does not leverage the previous work done during the extraction of the event e'. In various embodiments of multiresolution parsers described herein, however, the extraction of the event e can be made efficient after having processed the event e' for at least two reasons: First, if the feature sets $\{f'\}$ and $\{f\}$ have a non-null intersection, there exist features in $\{f\}$ that we have parsed before and, as such, only the features in the set $\{f\}\backslash\{f'\}$ need to be parsed. In general, if A and B are two sets, A\B is the set of elements in A and not in B. Thus, $\{f\}\backslash\{f'\}$ represents the features in $\{f\}$ that are not included in the feature set $\{f'\}$. Second, the feature bitsets corresponding to $\{f'\}$, denoted as $\beta(\{f'\})$, do not need to be parsed again since they contain none of the features in $\{f\}\backslash\{f'\}$. To be able to build on previous parsing efforts, a different type of operation referred to as carving is provided in various embodiments, to complement the memoryless parsing.

Carving complements parsing in that it builds the additional necessary logic and data structures so that future parsing effort can leverage any previous work. In general, the operator C( ) is a carver if it satisfies the following condition:

$$C(\text{NULL}, d, \{f\}) = C(C(\text{NULL}, d, \{f'\}), d\backslash\beta(\{f'\}), \{f\}\backslash\{f'\})$$

The above condition states that the parsing of features $\{f\}$ can be carried out by avoiding parsing features in $\{f\}$ that were also included in $\{f'\}$, by skipping the bits $\beta(\{f'\})$, and by leveraging the state of the carver after parsing features $\{f'\}$.

A carver is therefore implemented as a function C(s, d, $\{f\}$) that takes three arguments: (i) s: the output of a previous carving operation or NULL. This parameter embeds the necessary state so that the carver can resume work on a given dataset by leveraging any previous work; (ii) d: the dataset, or a subset thereof, determined based on the previously done work; and (iii) the features that need to be extracted. The set of features that need to be extracted in a particular iteration can be determined at least in part according to the unit of information to be extracted in that iteration and/or at least in part by the set(s) of feature(s) extracted previously, e.g., in one or more previous iterations.

Carvers thus generally describe a core function of multiresolution parsers because the process of following an increasing resolution sequence $r_1 \rightarrow r_2 \rightarrow \ldots r_n$ can be understood as a series of carving operations $C_1 \rightarrow C_2 \rightarrow \ldots \rightarrow C_n$. In general:

$C_1 = C(\text{NULL}, d, \{f_1\})$, where C1 is the state of the parsing system after the first carving operation.

$$C_2 = C(C_1, d \backslash \beta(\{f_1\}), \{f_2\} \backslash \{f_1\})$$

$$C_3 = C(C_2, d \backslash \beta(\{f_2\} \cup \{f_1\}), \{f_3\} \backslash (\{f_2\} \cup \{f_1\}))$$

...

$$C_n = C(C_{n-1}, d \backslash \beta(\{f_{n-1}\} \cup ... \cup \{f_1\}), \{f_n\} \backslash (\{f_{n-1}\} \cup ... \cup \{f_1\}))$$

Implementation of Multiresolution Parsers

As described above, various known parsers, when lacking processing capacity required to process a dataset, generally drop portions/packets of data in a nondiscriminatory manner. Various known parsers also do not leverage previous parsing work on a given dataset, and they typically cannot do so as they do not take into consideration increasing resolution sequences.

On the first limitation, some known parsers may implement the concept of data shunting. For example, for datasets made of computer network traffic, this technique often includes prioritizing the head of a connection against the tail. This type of data shunting is generally based on the principle of the heavy tailed nature of network traffic, according to which, on an average, the first several bytes of a connection tend to carry more information than those in the tail. This approach, however, is usually agnostic to the actual distribution of information in the data set, e.g., as represented by the dataset spectrum and, hence such an approach can lead to suboptimal packet dropping decisions. On the second limitation, some known parsers may implement the capability to record snapshots of their current state from which they can resume work. These parsers, however, do not determine the incremental effort necessary for extracting a new information unit if one or more information units were extracted previously.

Identifying Increasing Resolution Sequences

To guide the implementation of multiresolution parsing according to different embodiments, a known parser, Bro, was considered and the extensions required to enable multiresolution parsing are described. Bro is an open source network analyzer developed by the International Computer Science Institute. Bro's underlying technology is generally considered to be capable of effectively extracting a network feature that can be defined via a protocol standard. Out of the box, Bro provides support for parsing some commonly used network protocols (e.g., DNS, HTTP, IRC, SNMP, etc.) and provides a domain-specific language that programmers can use to code Bro network analytics. A network analytic in general is a Turing-complete program that provides instructions on how the input dataset is to be parsed. Because of its powerful approach and generality, Bro provides an archetypal example of a network parser.

In order to apply the multiresolution parsing framework, semantic levels that are available to Bro were identified. In addition to features and events, Bro provides a third semantic level: policies. Policies are implemented using the Bro language and can be understood as programs that process events to generate a certain output. Examples of policy outputs include the detection of a cybersecurity threat, the identification of a network behavior, the characterization of a network object, etc. As such, some embodiments of multiresolution parsers using the Bro framework entail three semantic levels: features, events and policies.

Figure 3:
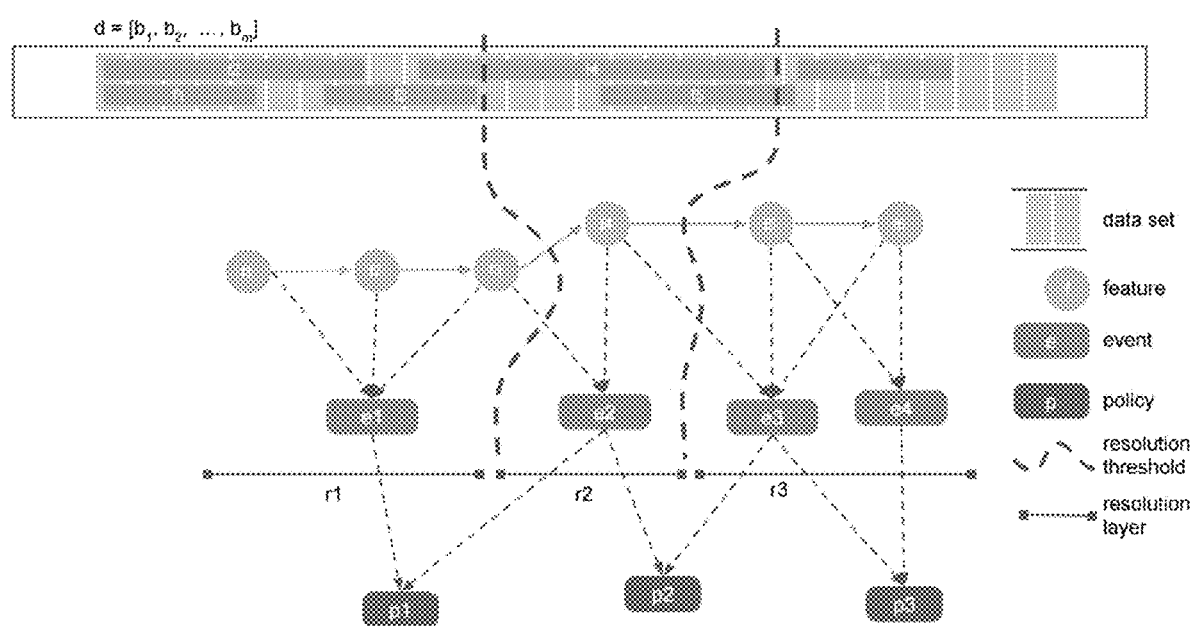
FIG. 3 depicts a spectrum of another dataset, according to one embodiment.

FIG. 3, depicting an example of a dataset spectrum based on the Bro framework, illustrates how the data set's features, events, and policies are related. Such a spectrum can be determined from one or more known datasets and/or one or more representative datasets. Once the spectrum is determined, the resolution thresholds may be identified, which in turn may provide the blueprints for identifying an increasing resolution sequence.

For example, given a Bro analytic, i.e., one or more policies of interest, and the order of determination of the policies and/or relative importance of the policies, the set of events required to execute the analytic can be identified. Given these events, the set of features required to resolve them can also be determined. Therefore, the analytic contains all the information needed to compute the IRS based according to a preference ordering $\geq_p$. For example, if an analytic specifies that policy p3 must be examined and/or determined before policy p1, which must be examined and/or determined before policy p2, the corresponding IRS is $r3 \geq_p r1 \geq_p r2$. Then, an optimized multiresolution parser according to some embodiments would first parse events e3 and e4, then event e1, and complete its work by parsing event e2. If during the processing of the dataset the capacity of the parser were to reach a limit such that all events cannot be analyzed, the parser would skip the processing of events in the reverse order in order to minimize information loss.

It should be understood that the extension of Bro described herein is illustrative only. In generally, the parsing and carving operators and the corresponding operations described herein can be included in any parser and/or a new parser incorporating these operators/operations can be built.

The Parsing and Carving Operators

In order to enable multiresolution parsing, parser technology is extended in various embodiments with the capability to carve data. In some embodiments, the property of compactness (Property 1) allows for the design of a base carving operator for mapping bits and/or bytes (or other units of data or bitsets) in the dataset to features as follows:

Operator: Carver:

In some embodiments, the carver operator uses: dataSet: a data set expressed as an array of bytes. The minimum resolution of information in a dataset is a bit; however, in practice, parsers tend to process bytes. Therefore, some embodiments used bytes, without loss of generality. In general, any unit of data such as a bit, byte, word, etc., can be used. The carver operator also uses: offset: an offset within dataSet pointing to the byte dataSet[offset]; featureSet: a set of feature identifiers; and index. Index is associated with a bitset. In various embodiments, the index is an array with the following key-value pairs:

nonFeatureSet: set of feature identifiers in featureSet that are guaranteed to not be present within the set of bytes dataSet[offset:offset+length]. Thus, the nonFeatureSet may include the features that were examined but were not found up to the current time during parsing. The nonFeatureSet may include one or more features;

length: the number of bits, bytes (or other data units) starting from dataSet[offset] that are associated with this index;

featureId: if the processed bitset represents a feature, the unique identifier of such feature; NULL otherwise; and featureValue: the value of the feature if featureId is not NULL. (e.g., in an HTTP header, the featureId may be REQUEST, to indicate the HTTP request field, and the featureValue may be GET, to indicate a value of the request field equal to 'GET').

Pseudo-code for a carver operator for a parser according to some embodiments is depicted in FIG. 4.

Operator: Multiresolution Parser:

In some embodiments, the multi-resolution parser operator uses: dataSet: a dataset expressed as an array of bytes;

offset: an offset within dataSet pointing to the byte dataSet [offset]; and featureSet: a set of feature identifiers. Pseudo-code for a multi-resolution parser operator for a parser according to some embodiments is depicted in FIG. 5. In various embodiments, the above base carving and parsing operators rely on the methods findFeature( ) and indexStore( ). Pseudo-codes for these methods, according to some embodiments, are shown in FIG. 6.

End-to-End Workflow

Figure 7:
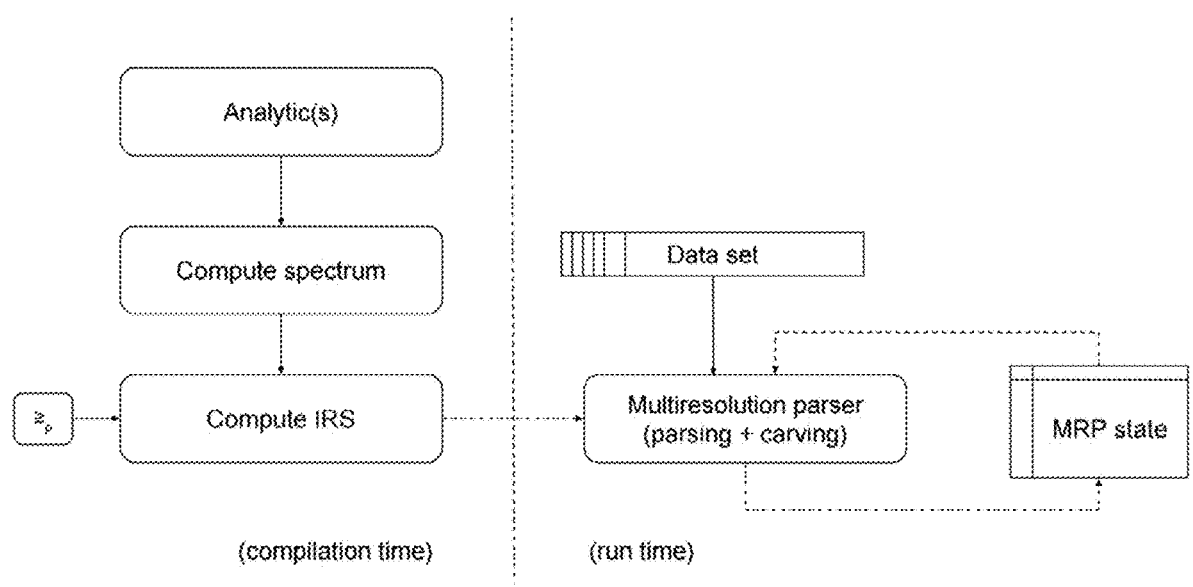
FIG. 7 schematically illustrates the compile-time process for configuring a multiresolution parser, according to one embodiment, and operating the multiresolution parser at run time, according to one embodiment.

With reference to FIG. 7, the overall workflow is divided into two groups of functions, depending on whether they are run at compilation time or at run time. At compilation time, the workflow starts with the development of one or more analytics. From the analytics, the set of events, policies, (or other information units), and the corresponding feature sets are extracted and used to compute the spectrum. From the spectrum, the increasing resolution sequence may be computed based on a pre-specified preference ordering $\geq_p$.

In general, if the analytics specifies the order of importance of the set of information units, the corresponding feature sets may be extracted from the dataset in order. As noted above, an information unit may include one or more events. The order of importance may be based on an information metric or value of the information unit, or on the cost of extracting the information unit, or a combination of these two parameters. At run time, various embodiments of multiresolution parsers carve the input data according to the preference ordering established by the IRS. As data is processed, to extract a specified information unit the parser builds the MRP state into a data structure, e.g., a table, storing all the features carved from the input data. During subsequent processing, the features extracted previously are not extracted again and the corresponding bitsets of the dataset are not processed again, thereby increasing efficiency and/or performance of a multiresolution parser.

In some embodiments, a multiresolution parser selects a suitable resolution level according to the available processing capacity. The resolution layers processed at that level are selected according to the IRS and, hence, the information units associated with a greater benefit and/or lower cost are extracted before extracting other information unit(s) having a lower benefit and/or a greater processing cost. If additional processing capacity becomes available, one or more additional resolution layers are added in the order of the IRS. If processing capacity decreases, one or more resolution layers are eliminated in the order of the IRS.

Ruleset-Aware Optimizations for Network Protocol Parsers

The framework described herein can be generally applied to the design of different multiresolution parsers for different types of rulesets. The performance of a parser can be improved further by making certain optimizations that are specific to each ruleset. Two such optimizations are presented for parsers adapted for analyzing computer network traffic.

Optimization 1: Connection skip. Let d be a dataset formed by a single connection running on a network protocol P. If the set $\{f\}$ contains no feature from protocol P, then C(NULL, d, $\{f\}$)=NULL and the parsing of d can be short circuited. This optimization reflects that there is no need to parse a connection that runs on a protocol that the analytic is not concerned with.

Optimization 2: Connection shunt. Let d be a dataset formed by a single connection. If C(NULL, d, $\{f\}$) !=NULL for all feature $f_i$ in $\{f\}$, and C(NULL, d, $\{f\}$)=C(NULL, d\d', $\{f\}$), then C(NULL, d', $\{f\}$)=NULL and the parsing of d' can be short circuited. This optimization reflects that there is no need to continue parsing a connection once all of the features have been identified.

Applications:

Big-Data Analysis: One relevant application of multiresolution parsers concerns with the problem of processing very large amounts of data, also known as big data problems. This type of problems typically analyze data sets so large that the performance of the parser often becomes crucial. Consider as an example a data set d with 1 TB of data, and assume that a present goal is to extract event $e_1=\{f_1\}$. Assume also that at another time a new goal is set, and the new goal is to extract event $e_2=\{f_2\}$. A conventional parser would be run twice without being able to leverage any previous work:

$C_1 = C(\text{NULL}, d, \{f_1\})$ $C_2 = C(\text{NULL}, d, \{f_2\})$

Using an embodiment of a multiresolution parser, however, past information can be leveraged to reduce future effort as follows:

$C_1 = C(\text{NULL}, d, \{f_1\})$ $C_2 = C(C_1, d \backslash \beta(\{f_1\}), \{f_2\} \backslash \{f_1\})$ This embodiment is particularly relevant in applications where future analytics are unknown at present time. Consider for instance the problem of detecting a cybersecurity threat from a large data set d including network traffic. Usually, security analysts develop new analytics on an on-going basis, as new vulnerabilities and zero-day attacks are discovered. As these new analytics are created, they can be used to parse d over and over. Various Embodiments of a multi-resolution parser provide the capability to continuously carve d in a way that all previous work can be leveraged, reducing the total amount of computations needed to run future analytics.

In general, embodiments of MRPs become more beneficial as the size of the input dataset increases. For example, the process of parsing of a C++ program may benefit less from a multiresolution approach because often the input dataset is small enough that the parser can fully process it as a single resolution level. As the size of the input data set increases, however, (1) exploiting the number of redundancies across analytics (expressed as $\{f_2\} \backslash \{f_1\}$), and (2) avoiding processing the same bit of information multiple times (expressed as $d \backslash \beta(\{f_1\})$), generally become determining factors affecting the overall performance of the system.

High-Performance Real Time Data Analysis

Another application of different embodiments of MRP can be found in real-time data analysis, in which the input dataset is received as a real-time stream. Using traditional parsing technology, as the transmission rate of the dataset increases beyond a certain level, the parser becomes congested and is forced to drop portions of the input data set in a nondiscriminatory manner. Various embodiments of multiresolution parses described herein provide a framework to make such data dropping decisions in an optimized manner according to the preference ordering specified by an increasing resolution sequence, as discussed above.

Figure 8:
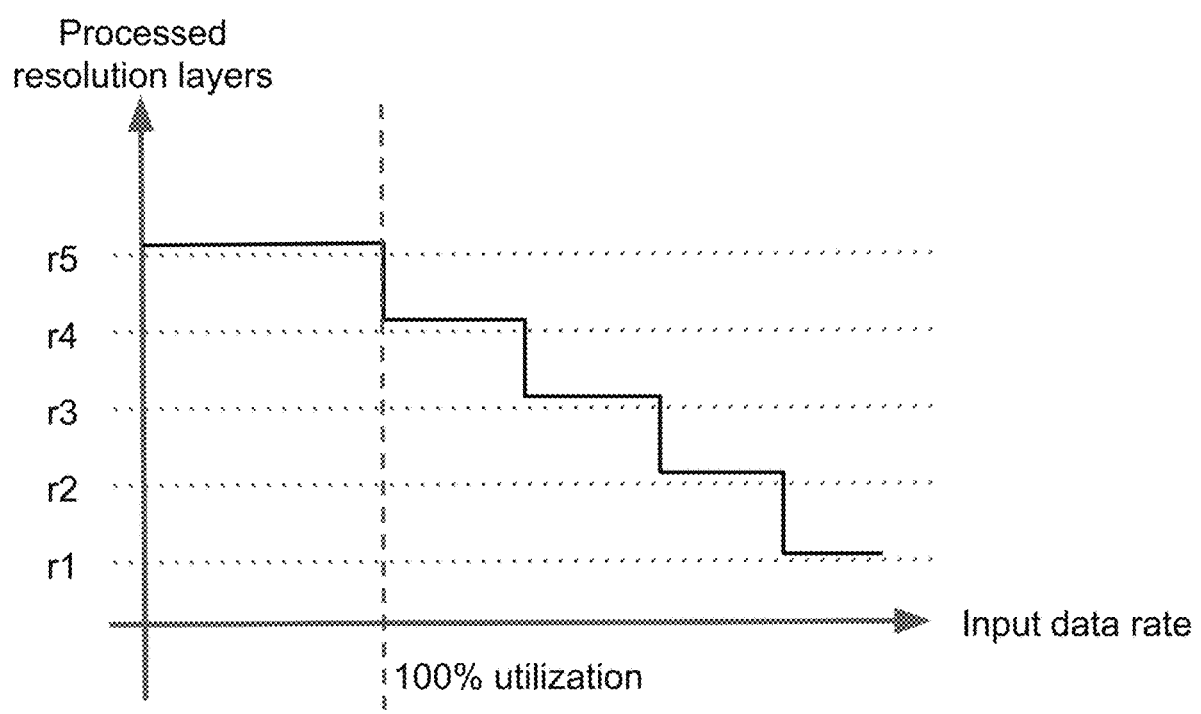
FIG. 8 depicts the selection of resolution levels of an adaptive multiresolution parser, according to one embodiment.

With reference to FIG. 8, in one embodiment, an MRP can process five different resolution layers. If the processing system has sufficient processing capacity, the MRP can fully process all five layers prior to reaching congestion. Upon reaching congestion, which can result from a reduction in the available processing capacity and/or an increase in the input data rate, the MRP may drop one or more resolution layers progressively according to the ordering specified by the increasing resolution sequence $r_1 \to r_2 \to r_3 \to r_4 \to r_5$. As described above, the IRS is constructed such that the processing of the resolution layer r1 has the greatest benefit-cost value and the resolution layer r5 has the least benefit-cost value.

Should more processing capacity become available at a later time and/or should the input data rate decrease, one or more previously dropped resolution layers can be added again, in reverse order, as long as the MRP does not become congested. The MRP, thus, can dynamically adapt to the state of the processing system in terms of e.g., available processors, memory, battery life, load of the available processors, etc., and the size and/or rate of the input data.

Data Indexing and Data Compression

Various embodiments of multiresolution parsers can be used to index data and to compress data/information. To this end, in some embodiments, after a bitset corresponding to a feature is processed, there is generally no need to process that bitset again, as discussed above. Since the information carried by the bitset is uniquely characterized by the carver index that represents it, as discussed with reference to the carver operator, the bitset can be dropped and only the corresponding index may be preserved, resulting in storage savings. Specifically, in some embodiments, a multiresolution parser can: (i) decide to not store portions of a dataset if they are already fully carved; and/or (ii) decide to store portions of a dataset in order to procrastinate carving operations. This can be useful when the parser needs to skip the processing of certain bitsets due to congestion.

EXAMPLES

With reference to FIG. 9A, an MRP according to one embodiment selects Resolution Level 2 based on the available processing capacity. The Resolution Level 2 includes Resolution Layer 1 at which Information Unit 1 is to be extracted, and Resolution Layer 2, at which Information Unit 2 is to be extracted. It should be understood that in general, a resolution level may include any number (e.g., 1, 2, 3, 5, 6, 8, 10, or more) of resolution layers. Each resolution layer may correspond to one or more hierarchies, e.g., features, events, policies, and/or other types of hierarchies. The number of hierarchies corresponding to a resolution layer can be any number such as 1, 2, 4, 5, 7, 8, 10, 12, or more. Each resolution layer includes one or more, e.g., 2, 4, 5, 8, 9, 11, etc. units of the top-most level of hierarchical units. At each level of hierarchy, a hierarchical unit may include any number, e.g., 1, 2, 3, 5, 6, 8, 10, or more units of the next lower level of hierarchy.

In the embodiment described with reference to FIG. 9A, there are two levels of hierarchies. In particular, Information Unit 1 includes two events: Event 1 and Event 2. Information Unit 2 includes a single event: Event 3. Event 1 corresponds to a subset of features (Feature Subset 1), having three features, namely, Feature 1, Feature 2, and Feature 3. Event 2 also corresponds to a subset of features (Feature Subset 2), having a single feature, i.e., Feature 4. Event 3 corresponds to another subset of features (Feature Subset 3) that includes two features: Feature 5 and Feature 6. Resolution Layer 1 thus corresponds to a set of feature subsets (Set of Feature Subsets 1) that includes the subsets Feature Subset 1 and Feature Subset 2. Similarly, Resolution Layer 2 corresponds to another set of feature subsets (Set of Feature Subsets 2) that includes the subset Feature Subset 3.

In this embodiment, for the convenience of discussion, all entities such as resolution layers, information units, events, sets of feature subsets, feature subsets, and features, are introduced in order. In general, however, this is not necessary. In other embodiments, any kind of entities may be used out of order and/or in a discontiguous manner. For example, a resolution level may include resolution layers 7, 11, 10, and 15. The resolution layer 11 may include information unit 1 and the resolution layer 10 may include the information unit 14. An information unit may include events 1, 4, and 6. A particular event may include features 2, 3, and 8, etc.

In the embodiment described with reference to FIG. 9A, as long as the available processing capacity does not change and the input data rate does not change, the Resolution Level 2 may be maintained and the dataset may be analyzed to test if all of features 1-6 exist and to test if events 1-3, corresponding to Information Units 1 and 2 occur. Should the rate of input data decrease and/or should the available processing capacity increase, the resolution level may be changed, and one or more additional resolution layers, selected in order of the IRS, may be processed, as well.

With reference to FIG. 9B, in one embodiment, the resolution level is changed to Resolution Level 3 and Resolution Layer 3 is also included. This new layer related to the extraction of Information Unit 3, which includes two events: Event 4 and Event 5. The subset of features corresponding to Event 4, denoted Feature Subset 4, includes two features, namely Feature 7 and Feature 8. The subset of features corresponding to Event 5, denoted Feature Subset 5, includes two features, namely Feature 9 and Feature 10. As such, the set of feature subsets associated with Resolution Layer 2, denoted Set of Feature Subsets 3, includes Feature Subset 4 and Feature Subset 5. As long as the available processing capacity does not change and the input data rate does not change, the Resolution Level 3 may be maintained and the dataset may be analyzed to test if all of features 1-10 exist and to test if events 1-5, corresponding to Information Units 1-3 occur.

Figure 9C:
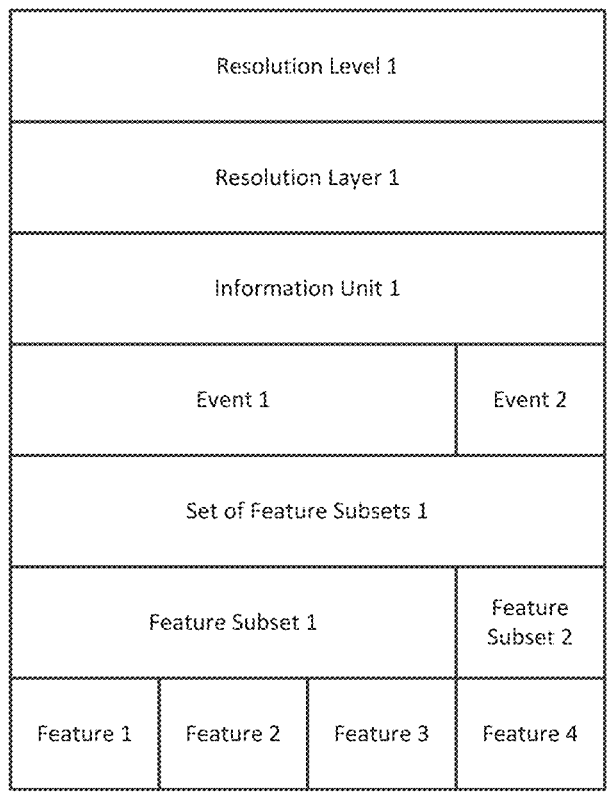

Should the rate of input data decrease further and/or should the available processing capacity increase further, the resolution level may be changed again, and one or more resolution layers, in addition to the resolution layers 1-3, selected in order of the IRS, may be processed. Should the rate of input data increase, however, and/or should the available processing capacity decrease, causing the MRP to become congested, one or more resolution layers are dropped in reverse order of the IRS till the MRP is no longer congested. With reference to FIG. 9C, in one embodiment, the resolution layers 3 and 2 are dropped, in that order, to avoid congestion. As long as the now available processing capacity does not change and the current input data rate does not change, the Resolution Level 1 may be maintained and the dataset may be analyzed to test if all of features 1-4 exist and to test if events 1 and 2, corresponding to Information Unit 1 occur.

Limiting the processing according to a selected resolution level not only allows an MRP to avoid congestion but also to direct significant (e.g., more than 30%, 40%, 75%, 90%, or more) of the computation time to determining the existence of complete features that correspond to one or more information units, as opposed directing significant computation time to only a partial analysis of several features which, as described above, may not yield useful information. In fact, some conventional parsers that spend significant amount of time parsing features partially and not completely, by dropping from a dataset, in a random or non-discriminating manner, some of the bits (or other units of data) that correspond to one or more features that were partially analyzed, experience performance collapse, i.e., such parses often produce no net output even though they consume computation resources and perform several computations. In various embodiments described herein, however, complete features corresponding to a selected resolution level are generally processed. The process of adjusting resolution levels according to the processing capacity, and processing information units, may continue while the stream of data continues.

Figure 10:
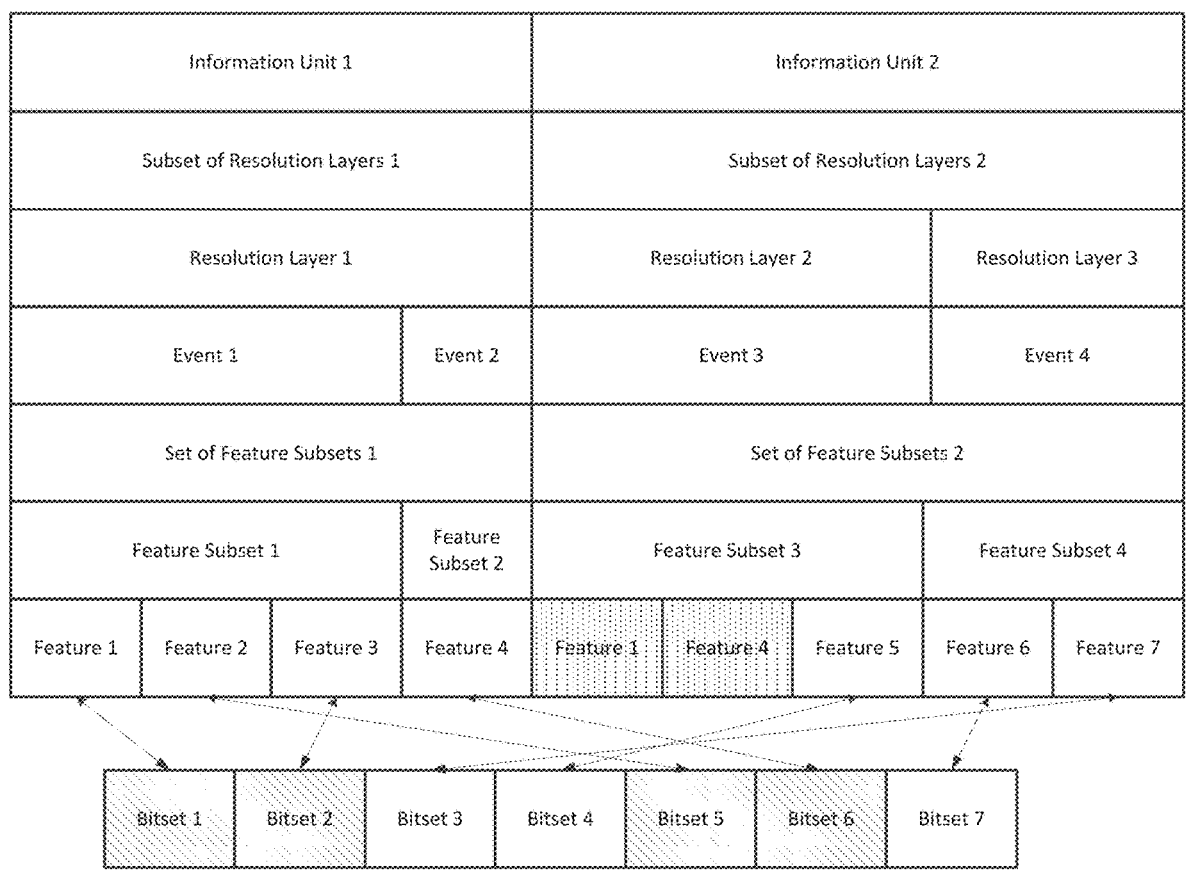
FIG. 10 illustrates iterative, state-aware processing by a multiresolution parser, according to one embodiment.

FIG. 10 illustrates off-line processing, using one embodiment of an MRP, of a dataset having seven bitsets, namely Bitset 1 through Bitset 7. The association between the locations of the bitsets and the corresponding features is also shown in FIG. 10. It should be understood that the number of bitsets and the depicted feature associations are illustrative only, and that a dataset in general may include any number e.g., 1, 3, 4, 10, 20, 35, or more features and corresponding bitsets. Typically, in a stream of data, the bitsets repeat and, accordingly, different features may be detected several times. Different instances of features may have the same or different values.

In one iteration, a user directs this embodiment of the MRP to analyze Information Unit 1. Information Unit 1 corresponds to a subset of the available resolution layers, denoted Subset of Resolution Layer 1, which contains a single resolution layer denoted Resolution Layer 1. Resolution Layer 1 includes two events: Event 1 and Event 2. Event 1 corresponds to Feature Subset 1, which includes Features 1-3. Event 2 corresponds to Feature Subset 2, which includes Feature 4. Subset of Resolution Layers 1 thus corresponds to the set of feature subsets denoted Set of Feature Subsets 1. During processing of Information Unit 1, this embodiment of the MRP analyzes all bitsets of the dataset and determines if any of the features corresponding to Information Unit 1, i.e., Features 1-4 exist. In this analysis, this embodiment also determines the respective locations of the features that do exist in the dataset. This information is preserved as part of the state of the processing corresponding to the present iteration.

During a subsequent iteration, a user directs this embodiment of the MRP to analyze Information Unit 2. Information Unit 2 corresponds to another subset of the available resolution layers, denoted Subset of Resolution Layer 2, which contains two resolution layers: Resolution Layer 2 and Resolution Layer 3. Resolution Layer 2 includes a single event, Event 3, and Resolution Layer 3 also includes a single event, denoted Event 2. Event 3 corresponds to Feature Subset 3, which includes: Feature 1, Feature 4, and Feature 5. Event 4 corresponds to Feature Subset 4, which includes Feature 6 and feature 7. Subset of Resolution Layers 2 thus corresponds to the set of feature subsets denoted Set of Feature Subsets 2, which includes Feature Subsets 3 and 4.

During processing of Information Unit 2, this embodiment of the MRP takes into consideration the state of the MRP after the previous iteration. From this state, this embodiment determines that Features 1 and 4 associated with Event 3 are also associated with previously processed Events 1 and 2. Therefore, this embodiment carves out Features 1 and 4 from the Set of Feature Subsets 2. Correspondingly, this embodiment also carves out Bitset 1, which corresponds to Feature 1, and Bitset 6, which corresponds to Feature 4, from the dataset using the dataset thus carved out, and the set of feature subsets carved out as described herein, this embodiment of the MRP tests if Features 5-7 exist in the carved-out dataset. In some embodiments, Bitsets 2 and 5, which correspond to Features 3 and 2, respectively, may also be carved out because these features are not relevant to Information Unit 2 and because the locations of these features in the dataset are now known from the state of the MRP after the previous iteration.

The carving out of the feature set (e.g., Set of Feature Subsets 2) and/or the carving out of the dataset can decrease the total number of computations needed to analyze Information Unit 2 relative to not taking into account the state of the MRP after the previous iteration and not performing any carving out. As such, analysis of Information Unit 2 can be performed efficiently, e.g., requiring relatively less of one or more of processing time, number of processors, processing capacity, memory, etc.

Referring again to FIG. 10, assume that Information Unit 1 requires Feature 8 (not shown) and that Feature 8 was not found in the dataset during the first iteration. Also assume that Information Unit 2 also requires Feature 8. From the state thereof after the previous iteration, this embodiment of the MRP may determine at the beginning of the current iteration that there is no need to process Information Unit 2 because Feature 8 required by that information unit does not exist in the dataset. This embodiment may readily determine that Information Unit 2 does not exist in the dataset, and may avoid a significant number of computations.

In the embodiment discussed with reference to FIG. 10, for the convenience of discussion, various entities such as information units, subsets of resolution layers, resolution layers, events, sets of feature subsets, feature subsets, and features, are introduced in order. In general, however, this is not necessary. In other embodiments, any kind of entities may be used out of order and/or in a discontiguous manner. As discussed above, and information unit may include only one level of hierarchy or more than two levels of hierarchy.

As discussed herein, parsing of information that takes into consideration the available processing capacity and/or the rate at which the data to be processed arrives cannot be considered to be a mathematical concept. Such parsing and parsing that takes into consideration the parser's state after one or more previous iterations, and uses that state information to increase efficiency of the processing in the current iteration, as described above, is also not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in multiresolution parsing, as described herein, are specifically orchestrated. Specifically, multiresolution parsing described in various embodiments involves analysis of spectra of expected datasets and prioritizing processing of high spectral energy components of the datasets, so as to maximize the benefit of processing while minimizing the cost thereof. These specific operations make the methods and systems for multiresolution parsing limited and specialized techniques of extracting useful information from data.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A system for parsing a dataset comprising a set of bitsets, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
   select, based at least in part on a first value of a performance constraint, a first resolution level, the first resolution level corresponding to a first subset of resolution layers from a set of resolution layers, each resolution layer in the set being associated with: (i) a respective information unit, and (ii) a respective set of feature subsets;
   determine, if a subset of bitsets in the dataset corresponds to a first feature group consisting essentially of the respective sets of feature subsets associated with the set of resolution layers corresponding to the first resolution level, that a first information unit corresponding to the first resolution level is associated with the dataset; and otherwise determine that the first information unit corresponding to the first resolution level is not associated with the dataset.

2. The system of claim 1, wherein the instructions further program the processing unit to:
select, based at least in part on a second value of the performance constraint, a second resolution level, the second resolution level corresponding to a second subset of resolution layers from the set of resolution layers;
determine, if a subset of bitsets in the dataset corresponds to a second feature group consisting essentially of the respective sets of feature subsets associated with the set of resolution layers corresponding to the second resolution level, that a second information unit corresponding to the second resolution level is associated with the dataset; and
otherwise determine that the second information unit corresponding to the second resolution level is not associated with the dataset.

3. The system of claim 2, wherein:
the second feature group comprises the first feature group; and
the second information unit comprises the first information unit.

4. The system of claim 2, wherein:
the second feature group lacks at least one feature subset from the first feature group; and
the second information unit is smaller than the first information unit.

5. The system of claim 1, wherein the first subset of resolution layers is same as the set of resolution layers.

6. The system of claim 1, wherein:
each bitset from at least a subset of bitsets is associated with a respective, particular feature, according to a specified map; and
for determining if the subset of bitsets in the dataset corresponds to the first feature group, the instructions program the processing unit to exclude a bitset not mapped to any feature in the sets of feature subsets associated with the resolution layers corresponding to the first resolution level.

7. The system of claim 1, wherein the subset of bitsets is same as the set of bitsets in the dataset.

8. A system for parsing a dataset comprising a set of bitsets, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
select, based at least in part on a first information unit, a first subset of resolution layers corresponding to the first information unit, from a set of resolution layers, each resolution layer in the set of resolution layers being associated with: (i) a respective, distinct information unit, and (ii) a respective set of feature subsets associated with that information unit;
assemble a first feature group consisting essentially of the sets of feature subsets associated with the first subset of resolution layers; and
identify from the set of bitsets of the dataset a first subset of bitsets corresponding to a first subgroup of features selected from the first feature group.

9. The system of claim 8, wherein the first subgroup of features is same as the first feature group.

10. The system of claim 8, wherein the instructions further program the processing unit to:
select, based at least in part on a second information unit, a second subset of resolution layers corresponding to the second information unit, from the set of resolution layers;
assemble a second feature group consisting essentially of the sets of feature subsets associated with the second subset of resolution layers;
generate a modified second feature group by excluding from the second feature group the first subgroup of features;
generate a second subset of bitsets of the dataset by excluding from the set of bitsets the first subset of bitsets; and
identify from the second subset of bitsets a third subset of bitsets corresponding to a second subgroup of features selected from the modified second feature group.

11. The system of claim 8, wherein the instructions further program the processing unit to:
identify an absent feature from the first feature group, the absent feature not corresponding to any bitset from the set of bitsets of the dataset;
select, based at least in part on a second information unit, a second subset of resolution layers corresponding to the second information unit, from the set of resolution layers;
assemble a second feature group consisting essentially of the sets of feature subsets associated with the second subset of resolution layers;
determine that the second feature group comprises the absent feature; and
determine, without further processing of any portion of the dataset, that the second information unit does not exist in the dataset.

12. A system for facilitating resolution-level-based parsing of a dataset comprising a set of bitsets, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
identify a set of features of a representative dataset;
associate each feature in the set of features with at least one information unit of a plurality of information units;
divide the set of features into a plurality of subsets, each subset being associated with a respective information unit;
associate with each resolution layer in a plurality of resolution layers: (i) a set of information units, and (ii) the subsets of features associated with the set of information units; and
rank the resolution layers according to an importance metric.

13. The system of claim 12, wherein each information unit comprises a respective set of events.

14. The system of claim 12, wherein each information unit comprises a respective set of policies, and each policy in a set of policies corresponds to a respective set of events.

15. The system of claim 12, wherein the importance metric comprises at least one of a cost of processing the subsets of features associated with the set of information units and a value of the set of information units.

16. A system for facilitating resolution-level-based parsing of datasets, the system comprising:
 a first processor; and
 a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
 identify a set of information units from a set of analytics, each information unit being associated with a set of features;
 compute a spectrum of the set of analytics, the spectrum comprising respective values of an importance metric for each information unit in the set of information units, the importance metric comprising at least one of: (i) an information value associated with a corresponding information unit, and (ii) a cost of extracting the set of features associated with the corresponding information unit;
 order the spectrum according to the respective values of the importance metric; and
 partition the ordered spectrum into a set of resolution layers, each resolution layer comprising a subset of information units and the set of features associated with each one of the subset of information units.

17. The system of claim 16, wherein each information unit comprises a respective set of hierarchical units.

18. The system of claim 17, wherein each hierarchical unit corresponds to a first hierarchical level and comprises a respective set of hierarchical units corresponding to a second hierarchical level.

19. The system of claim 18, wherein each hierarchical unit corresponding to the second hierarchical level comprises a respective set of hierarchical units corresponding to a third hierarchical level.

20. The system of claim 17, wherein:
 each hierarchical unit corresponding to the first hierarchical level comprises an event; and
 the set of hierarchical units corresponding to the second hierarchical level comprises a set of features associated with the information unit.

21. The system of claim 16, wherein the instructions program the processing unit to compute the cost of extracting the set of features associated with an information unit using at least one of: (i) a length of each feature in the set of features, (ii) cardinality of the set of features, and (iii) a processor characteristic.

22. The system of claim 21, wherein the processor characteristic comprises at least one of: (i) processor speed, and (ii) memory-access cost.

* * * * *